United States Patent
Ishihara

(10) Patent No.: US 12,251,968 B2
(45) Date of Patent: Mar. 18, 2025

(54) PNEUMATIC TIRE

(71) Applicant: BRIDGESTONE CORPORATION, Tokyo (JP)

(72) Inventor: Nobuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 334 days.

(21) Appl. No.: 17/762,154

(22) PCT Filed: Sep. 30, 2020

(86) PCT No.: PCT/JP2020/037245
§ 371 (c)(1),
(2) Date: Mar. 21, 2022

(87) PCT Pub. No.: WO2021/085021
PCT Pub. Date: May 6, 2021

(65) Prior Publication Data
US 2022/0410631 A1    Dec. 29, 2022

(30) Foreign Application Priority Data
Oct. 29, 2019   (JP) .................................. 2019-195798

(51) Int. Cl.
*B60C 11/03*     (2006.01)
*B60C 11/12*     (2006.01)

(52) U.S. Cl.
CPC ...... *B60C 11/0306* (2013.01); *B60C 11/1204* (2013.01); *B60C 11/1236* (2013.01);
(Continued)

(58) Field of Classification Search
CPC ............. B60C 11/0306; B60C 11/0311; B60C 11/1236; B60C 2011/0346;
(Continued)

(56) References Cited

U.S. PATENT DOCUMENTS

2008/0202658 A1* 8/2008 Ikeda .................... B60C 11/033
152/209.27
2012/0305155 A1  12/2012 Hamanaka
(Continued)

FOREIGN PATENT DOCUMENTS

JP    04-191104 A    7/1992
JP    06-227211 A    8/1994
(Continued)

OTHER PUBLICATIONS

JP 06-227211 Machine Translation (Year: 1994).*
(Continued)

*Primary Examiner* — Justin R Fischer
*Assistant Examiner* — Wendy L Boss
(74) *Attorney, Agent, or Firm* — Sughrue Mion, PLLC

(57) ABSTRACT

A pneumatic tire can suppress uneven wear of the tire and can improve traction performance on snow. Land portions (12A, 12B, 12C), between a pair of outermost side circumferential grooves (11d, 11d) on the outermost sides in the tire widthwise direction among a plurality of circumferential grooves (11a, 11b, 11c, 11d) extending in the tire circumferential direction, are divided into a plurality of blocks (14A, 14B, 14C) by widthwise grooves (13a, 13b, 13c). A pair of groove side faces (13ap, 13aq; 13bp, 13bq; 13cp, 13cq) opposed to each other in the widthwise grooves (13a, 13b, 13c) are bent at bent portions (Kp, Kq) thereof.

4 Claims, 6 Drawing Sheets

(52) U.S. Cl.
CPC .............. *B60C 2011/0344* (2013.01); *B60C 2011/0346* (2013.01); *B60C 2011/0353* (2013.01); *B60C 2011/1213* (2013.01)

(58) Field of Classification Search
CPC ..... B60C 2011/0344; B60C 2011/0353; B60C 11/1307; B60C 2011/1338
See application file for complete search history.

(56) References Cited

U.S. PATENT DOCUMENTS

| | | | |
|---|---|---|---|
| 2013/0328240 A1* | 12/2013 | Takahashi | B60C 11/1218 264/293 |
| 2014/0110027 A1 | 4/2014 | Kleffmann et al. | |
| 2016/0243898 A1* | 8/2016 | Ito | B60C 11/1236 |
| 2019/0225030 A1 | 7/2019 | Pizzorno et al. | |

FOREIGN PATENT DOCUMENTS

| | | |
|---|---|---|
| JP | 2008-201368 A | 9/2008 |
| JP | 2009-227154 A | 10/2009 |
| JP | 2019-137088 A | 8/2019 |
| WO | 2013/051053 A1 | 4/2013 |
| WO | 2015/056573 A1 | 4/2015 |
| WO | 2019/087980 A1 | 5/2019 |

OTHER PUBLICATIONS

International Search Report for PCT/JP2020/037245 dated Dec. 1, 2020 [PCT/ISA/210].
Written Opinion for PCT/JP2020/037245 dated Dec. 1, 2020 [PCT/ISA/237].
Extended European Search Report dated Feb. 15, 2023 from the European Patent Office in EP Application No. 20881078.8.

* cited by examiner

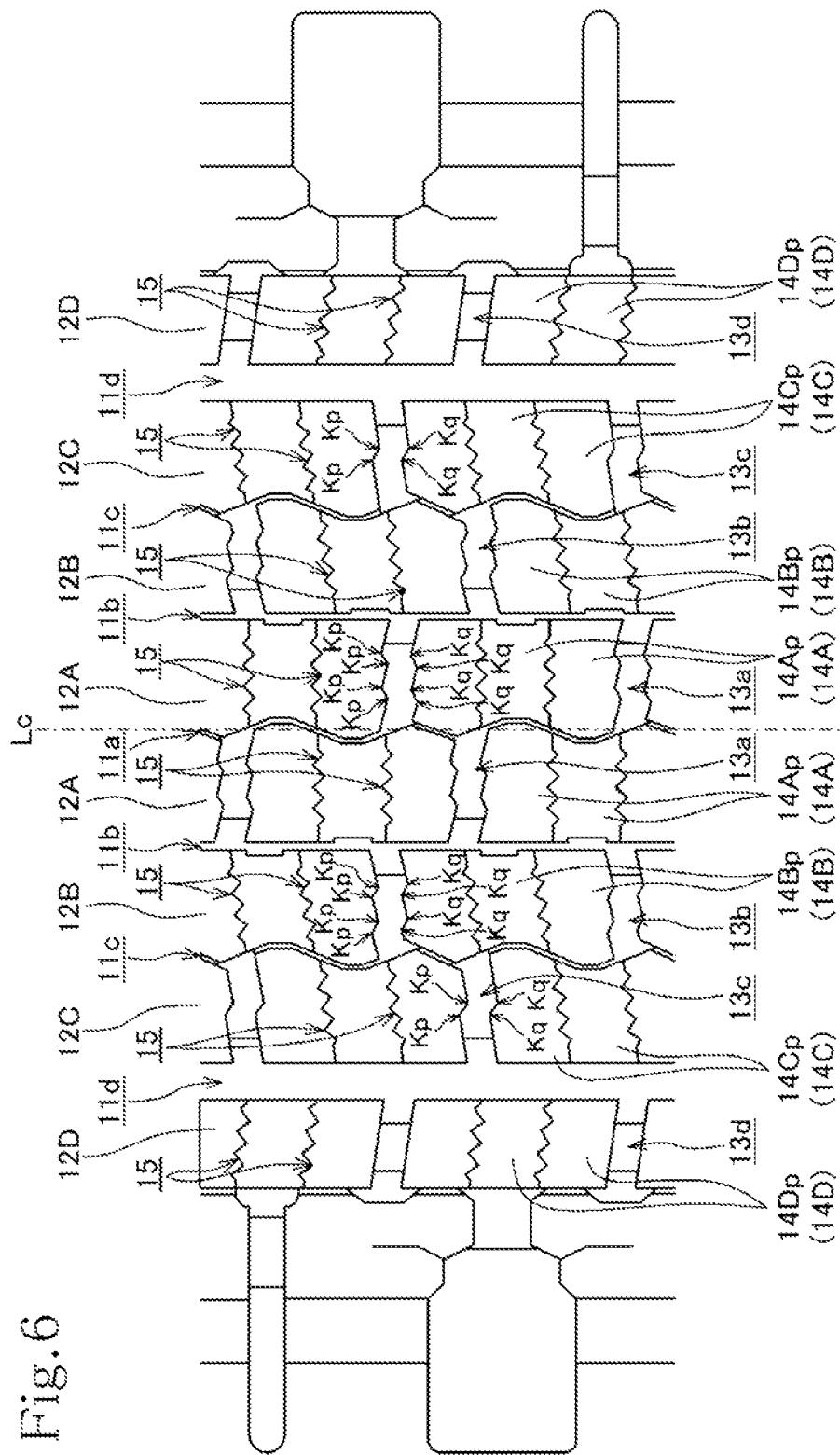

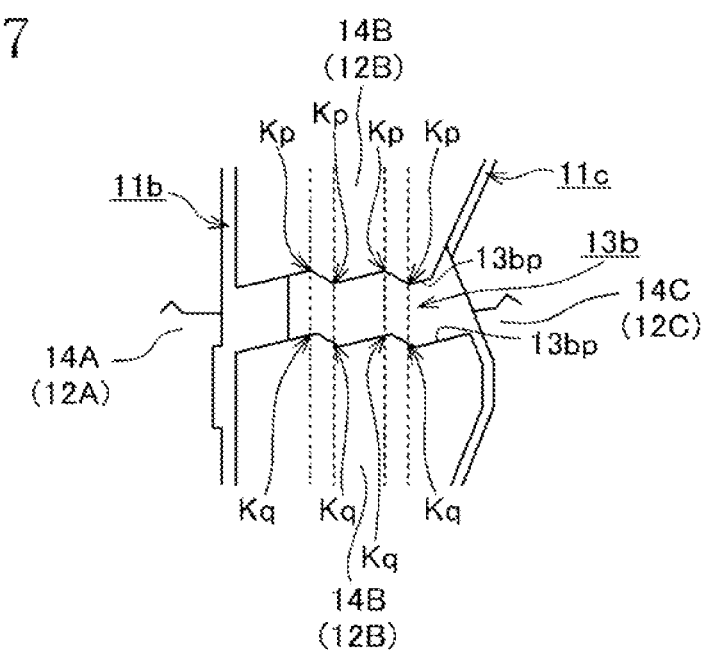

PNEUMATIC TIRE

CROSS REFERENCE TO RELATED APPLICATIONS

This application is a National Stage of International Application No. PCT/JP2020/037245 filed Sep. 30, 2020, claiming priority based on Japanese Patent Application No. 2019-195798 filed Oct. 29, 2019.

TECHNICAL FIELD

The present invention relates to a pneumatic tire, and particularly to a pneumatic tire that has improved performance on ice and snow.

BACKGROUND ART

In a tire of studless specifications that takes performance on ice and snow into consideration, a traction pattern is well known, wherein land portions, which are partitioned by circumferential grooves on a tire tread and are continuous in the circumferential direction, are divided into a plurality of blocks by widthwise grooves and sipes are formed in each block.

The sipes can improve the traction performance by eliminating, by water absorption, a water film formed between the road surface and the tire and tearing the road surface water film by edge portions of the sipes such that the tire comes into direct contact with the road surface.

However, the traction pattern that takes the performance on ice and snow described above into consideration has an underlying problem in uneven wear of the blocks (heel-and-toe uneven wear by which the kicking side of the blocks is worn greatly).

To cope with the problem, there has been proposed a tire in which improvement is sought in uneven wear resistance together with a performance on snow and ice (for example, refer to Patent Document 1).

PRIOR ART DOCUMENT

Patent Document

[Patent Document 1]
WO 2015/056573 A1

In the pneumatic tire disclosed in Patent Document 1, the groove width of a plurality of inner side circumferential grooves, provided between a pair of outermost side circumferential grooves on the outermost sides in the tire widthwise direction among circumferential grooves, is reduced such that inner side land portions, formed between the pair of outermost side circumferential grooves, are displaced to the middle of the tire in the tire widthwise direction to make the inner side land portions dense.

The inner side land portions on the opposite sides of the inner side circumferential grooves of the reduced groove width easily come into contact with each other upon grounding, whereby the plurality of inner side land portions is integrated with each other to thereby increase the rigidity as a whole. Consequently, even if small segmented blocks formed by segmentation with the sipes are acted upon by a high ground contact pressure, the inner side land portions are prevented from being deformed greatly, and also heel-and-toe uneven wear is reduced.

SUMMARY OF THE INVENTION

Underlying Problem to be Solved by the Invention

However, when deformation of the segmented blocks is suppressed, the edge pressure of ends of the segmented blocks decreases, deteriorating the traction performance on snow.

The present invention has been made in view of such problem as above described, and it is an object of the present invention to provide a pneumatic tire that can suppress uneven wear thereof and can improve the traction performance on snow.

Means to Solve the Problem

In order to achieve the object described above, the present invention provides a pneumatic tire, wherein the tire has a tread partitioned into a plurality of land portions that are continuous in a tire circumferential direction, by a plurality of circumferential grooves extending in the tire circumferential direction, the land portions continuous in the tire circumferential direction are divided into a plurality of blocks by a plurality of widthwise grooves extending in a tire widthwise direction, and the blocks are segmented into a plurality of segmented blocks by a plurality of widthwise sipes extending in the tire widthwise direction, characterized in that:

the circumferential grooves include a pair of outermost side circumferential grooves on outermost sides in the tire widthwise direction, and a plurality of inner side circumferential grooves arrayed between the pair of outermost side circumferential grooves, the inner side circumferential grooves have a groove width that is smaller than a groove width of the outermost side circumferential grooves and that allows the land portions on opposite sides of the inner side circumferential grooves to come into contact with each other upon grounding, and a pair of groove side faces opposed to each other in the widthwise grooves provided between the pair of outermost side circumferential grooves are bent at bent portions.

According to the above feature, the pair of groove side faces, opposed to each other in the widthwise grooves that divide the plurality of land portions between the pair of outermost side circumferential grooves into the plurality of blocks, are bent at the bent portions, whereby the entire volume of the widthwise grooves increases, and the amount of snow to be caught by the widthwise grooves can be increased to improve the snow column shearing force.

Further, since the pair of groove side faces of the widthwise grooves constitutes a pair of block end faces opposed to each other in the blocks divided by the widthwise grooves, the block end faces are bent at the bent portions, and the edge components increase to increase the edge pressure. This improves the traction performance on snow together with the snow column shearing force.

Further, the inner side circumferential grooves are smaller in groove width than the outermost side circumferential grooves and have the width which allows the land portions on the opposite sides thereof to come into contact with each other upon grounding, and the inner side land portions and the outer side land portions are displaced to the middle in the tire widthwise direction to be dense. Thus, even if the bent portions are formed on the pair of groove side faces of the widthwise grooves, the blocks of the land portions come into contact with each other, upon grounding, to integrate the plurality of land portions with each other and thereby increase the rigidity as a whole. Consequently, even if the blocks are acted upon by a high contact ground pressure, they are prevented from being deformed greatly, and also heel-and-toe uneven wear is suppressed.

In a preferred embodiment of the present invention, the bent portions on the pair of opposed groove side faces form a pair or pairs, and the bent portions of the same pair are provided at same positions as each other with respect the tire widthwise direction.

According to this feature, since the bent portions of the same pair, at which the pair of groove side faces of the widthwise grooves are bent, are provided at the same positions as each other in the tire widthwise direction, snow caught and treaded down by the widthwise grooves can be discharged readily in the tire widthwise direction.

In the preferred embodiment of the present invention, the pairs of the bent portions that are provided at the same positions in the tire widthwise direction are provided in plural number in the tire widthwise direction, and the bent portions adjacent to each other in the tire widthwise direction are bent in bending directions opposite to each other.

According to this feature, the pairs of the bent portions that are provided at the same positions in the tire widthwise direction are provided in plural number in the tire widthwise direction, and the bent portions adjacent to each other in the tire widthwise direction are bent in the bending directions opposite to each other. Therefore, the groove side faces have a zigzag shape, and the edge components further increase to further increase the edge pressure and further improve the traction performance on snow.

In the preferred embodiment of the present invention, the land portions provided between the pair of outermost side circumferential grooves include an outer side land portion partitioned by the outermost side circumferential groove and the inner side circumferential groove, and inner side land portions partitioned on the opposite sides thereof by the inner side circumferential grooves, and the bent portions formed on the groove side faces of the inner side widthwise grooves that divide the inner side land portions are greater in number than the bent portions formed on the groove side faces of the outer side widthwise grooves that divide the outer side land portion.

According to this feature, since the bent portions formed on the groove side faces of the inner side widthwise grooves are greater in number than the bent portions formed on the groove side faces of the outer side widthwise grooves, it is possible to make greater the number of bent portions to be formed on the groove side faces of the inner side widthwise grooves to increase the amount of snow to be caught by the inner side widthwise grooves. Meanwhile, it is possible to make smaller the number of bent portions to be formed on the groove side faces of the outer side widthwise grooves to increase the snow discharging amount of the outer side widthwise grooves.

In the preferred embodiment of the present invention, the widthwise sipes extend in a zigzag shape in the tire widthwise direction while repetitively deflecting in the tire circumferential direction.

According to this feature, since the widthwise sipes extend in a zigzag shape in the tire widthwise direction while repetitively deflecting in the tire circumferential direction, the edge components of the widthwise sipes increase, and the traction performance can further be improved.

Effect of the Invention

According to the present invention, since the pair of groove side faces opposed to each other in the widthwise grooves that divide the plurality of land portions between the pair of outermost side circumferential grooves into the plurality of blocks, are bent at the bent portions, the entire volume of the widthwise grooves increases, and the amount of snow to be caught by the widthwise grooves can be increased to improve the snow column shearing force.

Further, since the pair of groove side faces of the widthwise grooves are a pair of block end faces opposed to each other in the blocks divided by the widthwise grooves, the block end faces are bent at the bent portions, and the edge components increase to increase the edge pressure. This improves the traction performance on snow together with the snow column shearing force.

Further, the inner side circumferential grooves are smaller in groove width than the outermost side circumferential grooves and have the width that allows the land portions on the opposite sides thereof to come into contact with each other upon grounding, and the inner side land portions and the outer side land portions are displaced to the middle of the tire in the tire widthwise direction to be dense. Thus, even if the bent portions are formed on the pair of groove side faces of the widthwise grooves, upon grounding, the blocks of the land portions come into contact with each other to integrate the plurality of land portions with each other and thereby increase the rigidity as a whole. Consequently, even if the blocks are acted upon by a high contact ground pressure, they are prevented from being deformed greatly, and also heel-and-toe uneven wear is suppressed.

BRIEF DESCRIPTION OF THE DRAWINGS

FIG. 6 is a partial development view of a tread of a pneumatic tire according to another embodiment; and FIG. 7 is a partial enlarged plan view of an inner side land portion of the tread.

MODES FOR CARRYING OUT THE INVENTION

An embodiment according to the present invention will now be described with reference to FIGS. 1 to 5.

Figure 1:
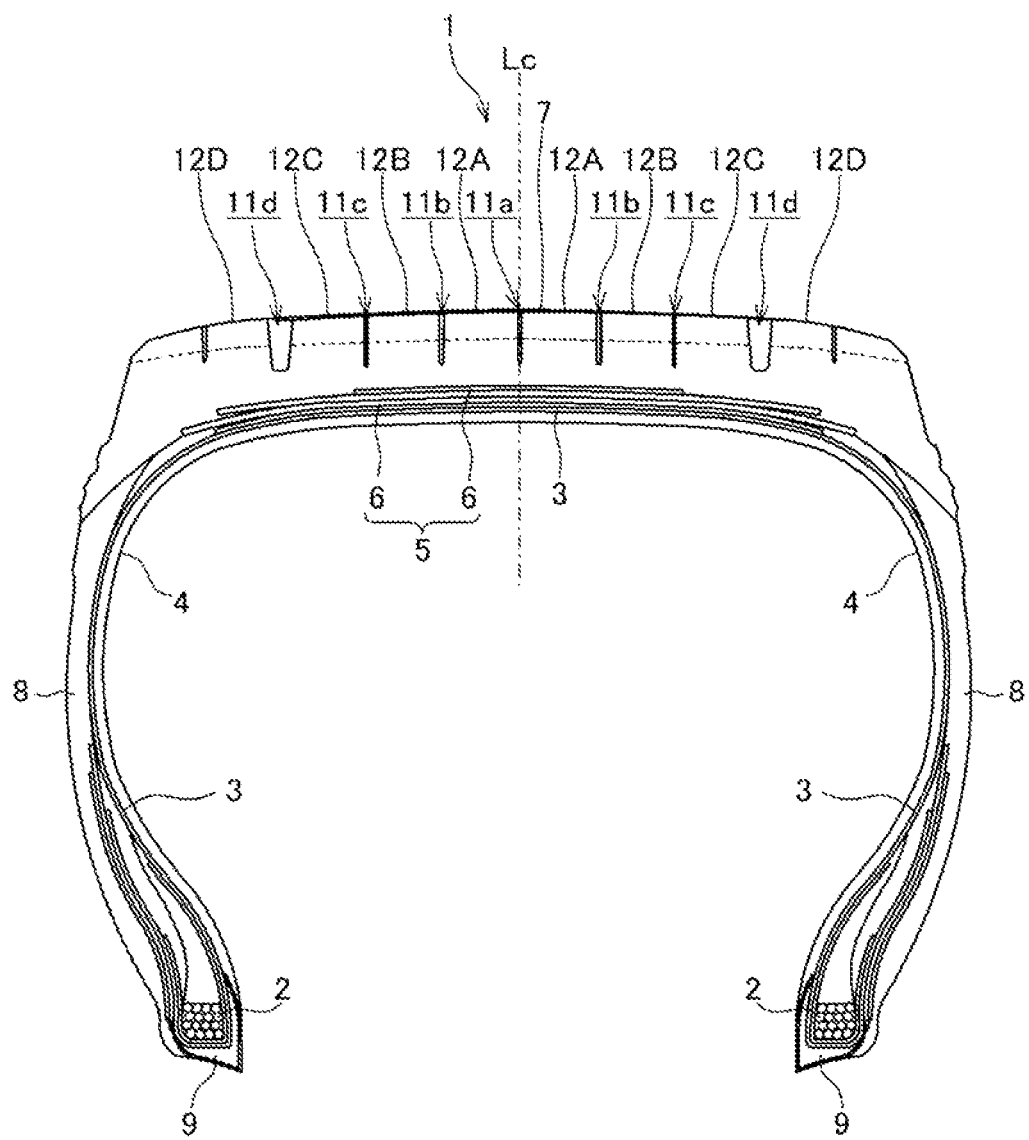
FIG. 1 is a cross sectional view, in a tire widthwise direction, of a pneumatic tire according to an embodiment of the present invention.

FIG. 1 is a cross sectional view, in a tire widthwise direction, of a pneumatic tire 1 according to the present embodiment that is a radial tire for heavy load for trucks or buses (the view being a sectional view taken along a plane including a tire rotational center axis).

The pneumatic tire 1 includes a pair of left and right bead rings 2 each formed from a metal wire wound in a ring shape, and a carcass ply 3 is formed such that the opposite side edges thereof are wound on the bead rings 2 while a portion thereof between the opposite side edges swells to the outer side in tire diametrical directions such that the carcass ply 3 is formed in a toroidal shape.

An air permeable inner liner portion 4 is formed on the inner surface of the carcass ply 3.

A plurality of belts 6 are placed on each other and wound on an outer periphery of a crown portion of the carcass ply 3 to form a belt layer 5, and a tread 7 is formed on the outer side of the belt layer 5 in a tire diametrical direction in such a manner to cover the belt layer 5.

The belt layer 5 is formed from the belts 6 placed one on another in a plurality of layers, and each belt 6 is formed in the form of a belt in which belt cords are covered with belt rubber.

Side wall portions 8 are formed on outer surfaces of the opposite side portions of the carcass ply 3.

A bead portion 9 covers each annular end portion of the carcass ply 3 and is wound and folded back on each bead ring 2. The bead portion 9 is continuous on the inner side thereof to the inner liner portion 4 and continuous on the outer side thereof to the side wall portion 8.

Figure 2:
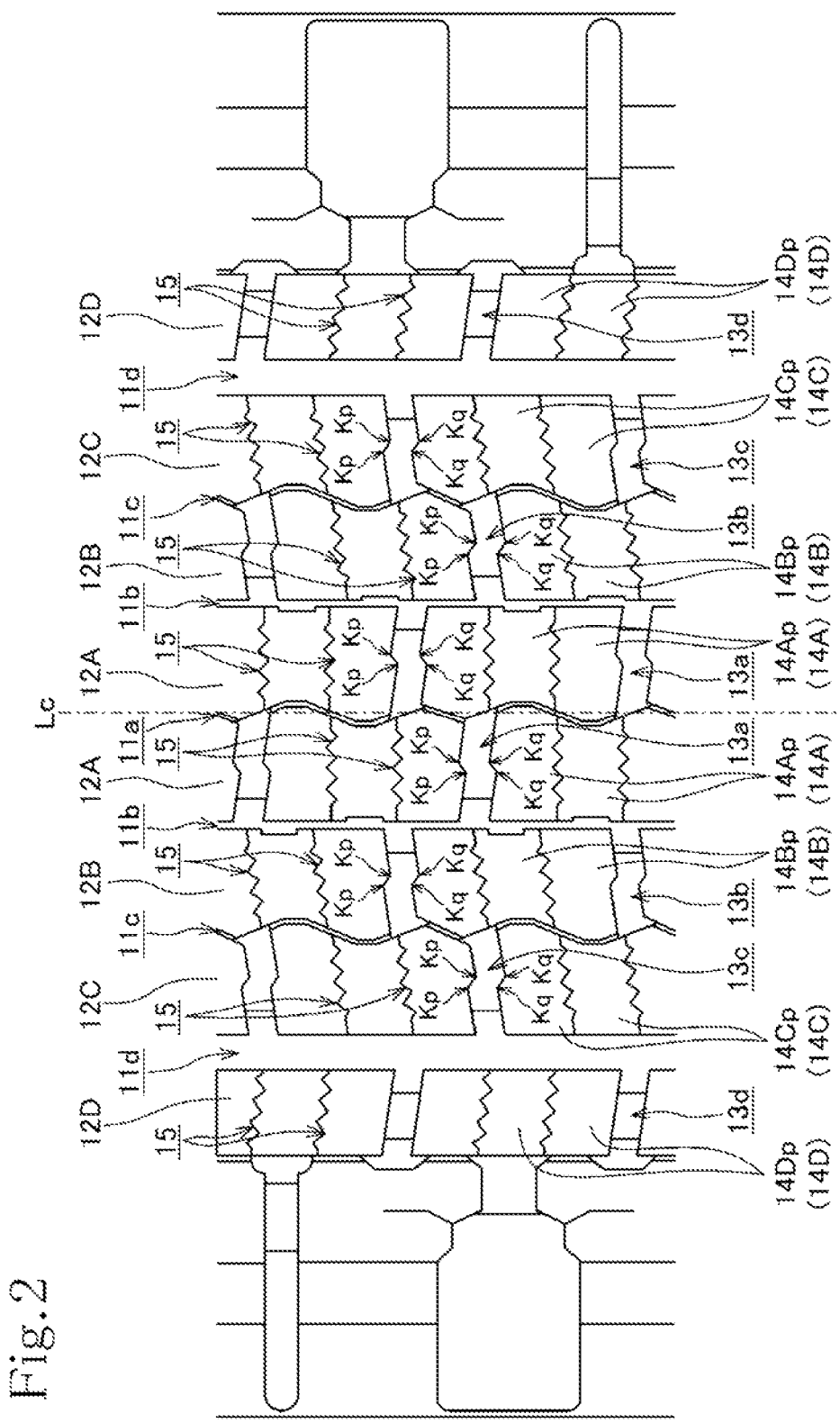
FIG. 2 is a partial development view of a tread of the pneumatic tire.

FIG. 2 is a partial development view of the tread 7.

Referring to FIGS. 1 and 2, seven circumferential grooves extending in a tire circumferential direction are formed in the tread 7. On the opposite outer sides of five inner side circumferential grooves 11c, 11b, 11a, 11b and 11c located on the inner side among the seven circumferential grooves, a pair of outermost side circumferential grooves 11d are formed.

One inner side circumferential groove 11a is formed on a tire equator line Lc in the middle in the tire widthwise direction. The inner side circumferential grooves 11b and 11c on each side of the circumferential groove 11a form a pair, and the two pairs on both sides of the groove 11a are in a symmetrical relation with respect to the tire equator line Lc. Further, on the further outer sides of the inner side circumferential grooves 11c paired with each other, the pair of outermost side circumferential grooves 11d are formed, respectively.

The tread 7 is partitioned, by the seven circumferential grooves, into eight land portions continuous in the circumferential direction. Between the pair of outermost side circumferential grooves 11d, inner side land portions 12B, 12A, 12A and 12B are partitioned and formed. These inner side land portions are located between the inner side circumferential grooves 11a, 11b, and 11c. Outer side land portions 12C are partitioned and formed between the outermost side circumferential groove 11d and the inner side circumferential groove 11c, respectively. Shoulder land portions 12D are arrayed on the outer sides of the outermost side circumferential grooves 11d.

The inner side circumferential grooves 11a, 11b, and 11c are smaller in groove width than the outermost side circumferential grooves 11d. The groove width of the inner side circumferential grooves are such as to allow, upon grounding of the tire, the land portions on the opposite sides thereof to come into contact with each other.

The inner side circumferential grooves 11a and 11c extend in a zigzag shape in the tire circumferential direction, so as to be repetitively deflected in the tire widthwise directions.

On the other hand, the inner side circumferential grooves 11b extend linearly in the tire circumferential direction.

The inner side land portions 12A and 12B are divided into a plurality of blocks 14A and 14B by inner side widthwise grooves 13a and 13b, respectively.

The outer side land portions 12C are divided into a plurality of blocks 14C by outer side widthwise grooves 13c.

The shoulder land portions 12D are also divided into a plurality of blocks 14D by shoulder widthwise grooves 13d.

The inner side widthwise grooves 13a and 13b, the outer side widthwise grooves 13c, and the shoulder widthwise grooves 13d have a groove width substantially equal to that of the outermost side circumferential grooves 11d.

The blocks 14A, 14B, 14C, and 14D are each segmented into a plurality of segmented blocks 14Ap, 14Bp, 14Cp, and 14Dp by a plurality of widthwise sipes 15 extending in the tire widthwise direction.

The widthwise sipes 15 extend in a zigzag shape in the tire widthwise directions while repetitively deflecting in the tire circumferential directions.

The inner side widthwise grooves 13a, formed in the inner side land portions 12A adjacent to each other in the tire widthwise direction with the inner side circumferential groove 11a interposed therebetween, are formed in a mutually displaced relation with each other in the tire circumferential direction. For this reason, the blocks 14A, which are divided by the inner side widthwise grooves 13a and are adjacent to each other in the tire widthwise direction, are arrayed in a displaced relation in a zigzag pattern in the tire circumferential direction.

The inner side widthwise grooves 13a and 13b, formed in the inner side land portions 12A and 12B adjacent to each other in the tire widthwise direction with the inner side circumferential groove 11b interposed therebetween, are formed in a displaced relation with each other in the tire circumferential direction. For this reason, the blocks 14A and 14B, which are divided by the inner side widthwise grooves 13a and 13b and are adjacent to each other in the tire widthwise direction, are arrayed in a displaced relation in a zigzag pattern in the tire circumferential direction.

The inner side widthwise grooves 13b and the outer side widthwise grooves 13c, formed in the inner side land portions 12B and the outer side land portions 12C adjacent to each other in the tire widthwise direction with the inner side circumferential grooves 11c interposed therebetween, are formed in a displaced relation with each other in the tire circumferential direction. For this reason, the blocks 14B and the blocks 14C that are each divided by the inner side widthwise grooves 13b and the outer side widthwise grooves 13c and are adjacent to each other in the tire widthwise direction, respectively, are arrayed in a displaced relation with each other in the tire circumferential direction.

Figure 3:
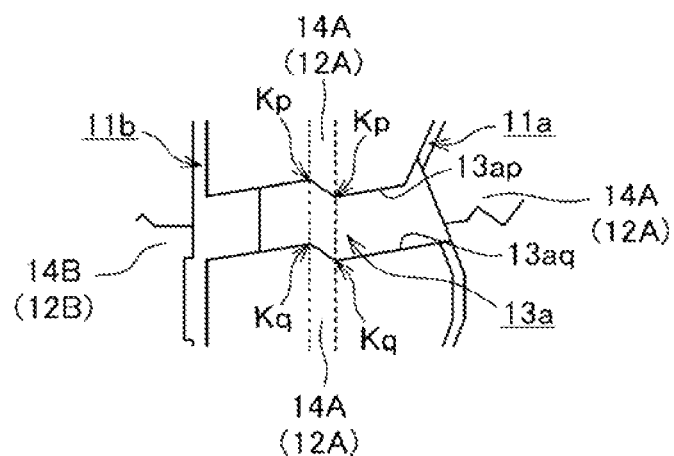
FIG. 3 is a partial enlarged plan view of an inner side land portion of the tread.

FIG. 3 is a partial enlarged plan view depicting one inner side widthwise groove 13a that divides an inner side land portion 12A and associated portions on an enlarged scale.

The inner side widthwise groove 13a extending in the tire widthwise direction is open at one end thereof to the inner side circumferential groove 11a and communicates at the other end thereof with the inner side circumferential groove 11b.

A pair of groove side faces 13ap and 13aq opposed to each other in the inner side widthwise groove 13a are bent at bent portions Kp and Kq, respectively.

Each of the bent portions Kp of the groove side face 13ap and each of the bent portions Kq of the groove side face 13aq are formed in pair at the same positions (refer to broken lines in FIG. 3) with respect to the tire widthwise direction.

It is to be noted that the same positions in the tire widthwise direction are positions at distances equal to each other in the tire widthwise direction from the tire equator line Lc.

Such paired bent portions Kp and Kq formed at the same positions in the tire widthwise direction are formed in two pairs in a spaced relation with each other in the tire widthwise direction.

The bent portions Kp adjacent to each other in the tire widthwise direction on the groove side face 13ap are bent in bending directions opposite to each other such that the groove side face 13ap has a zigzag shape.

Similarly, the bent portions Kq adjacent to each other in the tire widthwise direction on the groove side face 13aq are bent in bending directions opposite to each other such that the groove side face 13aq has a zigzag shape, and the groove side face 13ap and the groove side face 13aq extend in parallel to each other.

Figure 4:
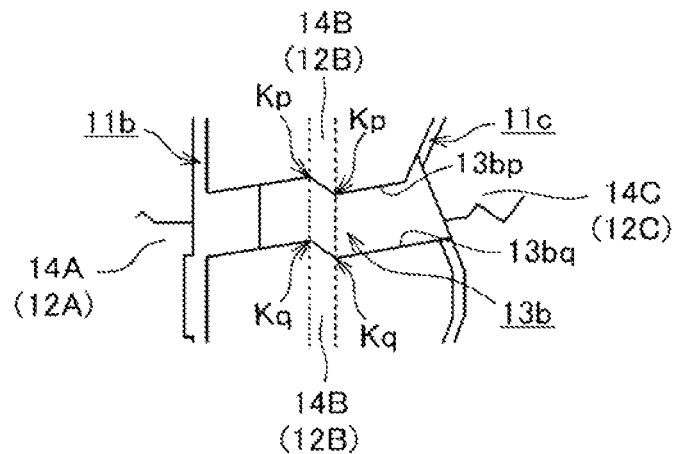
FIG. 4 is an enlarged plan view of a different portion of the inner side land portion of the tread.

While the foregoing describes the shape of the inner side widthwise groove 13a that divides the inner side land portion 12A, the inner side widthwise groove 13b that divides the inner side land portion 12B also has a shape same as that of the inner side widthwise groove 13a, and one inner side widthwise groove 13b that divides the inner side land portion 12B and associated portions are depicted in FIG. 4.

Figure 5:
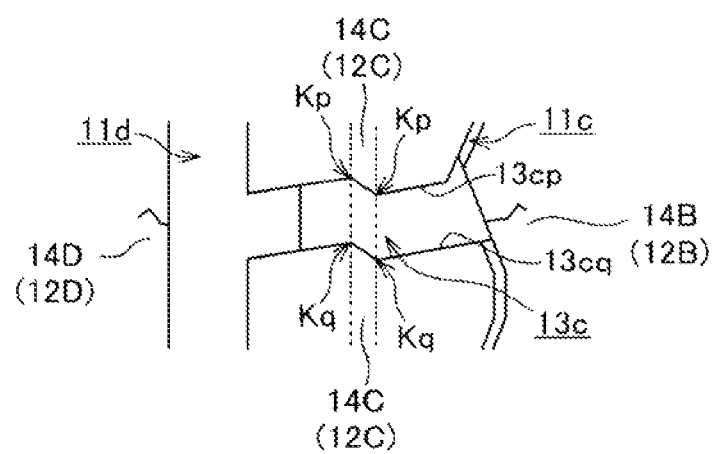
FIG. 5 is an enlarged plan view of another different portion of the inner side land portion of the tread.

FIG. 5 is a partial enlarged plan view, on an enlarged scale, depicting one outer side widthwise groove 13c that divides the outer side land portion 12C and also depicting associated portions.

The outer side widthwise groove 13c extending in the tire widthwise direction is open at one end thereof to the inner side circumferential groove 11c and communicates at the other end thereof with the outermost side circumferential groove 11d.

The outer side widthwise groove 13c has, similarly to the inner side widthwise groove 13b, two pairs of bent portions Kp and Kq in the tire widthwise direction on the groove side faces 13cp and 13cq opposed to each other, the two pairs of bent portions Kp and Kq being formed at positions same as each other in the tire widthwise direction (refer to broken lines in FIG. 5) such that the groove side face 13cp and the groove side face 13cq extend in parallel to each other and form zigzag shapes.

The first embodiment according to the present invention described in detail above has the following advantageous effects.

There are provided the bent portions Kp and Kq on the pair of groove side faces 13ap, 13aq; 13bp, 13bq; and 13cp and 13cq opposed to each other in the widthwise grooves 13a, 13b, and 13c that divide the plurality of land portions 12A, 12B, and 12C between the pair of outermost side circumferential grooves 11d into the plurality of blocks 14A, 14B, and 14C.

The pair of groove side faces 13ap and 13aq (13bp, 13bq; 13cp, 13cq) of the widthwise groove 13a (13b; 13c) are a pair of block end faces opposed to each other in the blocks 14A (14B; 14B, 14C; 14C), and such block end faces are bent at the bent portions Kp and Kq. This specific configuration increases edge components to thereby increase the edge pressure so as to improve the traction performance on snow.

Further, the inner side circumferential grooves 11a, 11b, and 11c have a groove width that is smaller than that of the outermost side circumferential grooves 11d. This configuration causes, upon grounding, the land portions on the opposite sides of the circumferential grooves to come into contact with each other. Furthermore, the inner side land portions 12A and 12B and the outer side land portions 12C are arranged toward the middle with respect to the tire widthwise direction. For this reason, even if the bent portions Kp and Kq are formed on the pair of groove side faces 13ap and 13aq (13bp, 13bq; 13cp, 13cq) of the widthwise groove 13a (13b; 13c), the blocks 14A, 14B, and 14C of the land portions 12A, 12B, and 12C, upon grounding, come into contact with each other and to integrate the plurality of land portions with each other and increase the rigidity as a whole. Consequently, even if the blocks 14A, 14B, and 14C are acted upon by a high ground-contact pressure, they are prevented from being greatly deformed, and also the heel-and-toe uneven wear is suppressed.

The bent portions Kp and Kq, at which the pair of groove side faces 13ap and 13aq (13bp, 13bq; 13cp, 13cq) of the widthwise groove 13a (13b; 13c) are bent, respectively, are provided at the same positions as each other with respect to the tire widthwise direction. Therefore, the direction of discharge of snow, which is caught into, and increased in solidity in the widthwise grooves 13a (13b, 13c), can be reliably changed in the direction of discharge by the bent portions Kp and Kq located at the same position with respect to the tire widthwise direction. Consequently, the discharging resistance can be reduced to discharge the snow reliably in the tire widthwise direction.

Two pairs of such paired bent portions Kp and Kq are formed at the same positions with respect to the tire widthwise direction, and the bent directions of the pair of bent portions Kp (Kq) adjacent to each other in the tire widthwise direction are opposite to each other. For this reason, the groove side faces 13ap and 13aq (13bp, 13bq; 13cp, 13cq) have a zigzag shape, so that the edge components are increased further to thereby increase the edge pressure and to further improve the traction performance on snow.

Since the widthwise sipes 15 formed in the blocks 14A, 14B, 14C, and 14D extend in a zigzag shape in the tire widthwise direction so as to repetitively deflect in the tire circumferential direction, the edge components of the widthwise sipes 15 increase, and the traction performance can further be improved.

A tread of a pneumatic tire according to another embodiment of the present invention will be described with reference to FIGS. 6 and 7.

FIG. 6 is a partial development view of a tread pattern of the pneumatic tire, and FIG. 7 is a partial enlarged plan view of an inner side land portion of the tread.

The tread pattern of the present pneumatic tire is same as the tread pattern of the pneumatic tire of the embodiment described hereinabove, except a part of it, and, for portions identical or similar to the above described embodiment, reference signs identical to those in the embodiment described above are used.

Among the land portions 12A, 12B, and 12C, the land portion 12C on the outer side in the tire widthwise direction will be referred to as outer side land portions 12C, and the land portions 12A and 12B between the opposite outer side land portions 12C will be referred to as inner side land portions 12A and 12B.

The outer side land portions 12C are partitioned by the outermost side circumferential grooves 11d and the inner side circumferential grooves 11c.

The inner side land portions 12A are partitioned by the inner side circumferential grooves 11a and the inner side circumferential grooves 11b, and the inner side land portions 12B are partitioned by the inner side circumferential grooves 11b and the inner side circumferential grooves 11c.

The outer side land portions 12C are divided into a plurality of blocks 14C by outer side widthwise grooves 13c extending in the tire widthwise direction, and the inner side land portions 12A and 12B are divided into blocks 14A and 14B by inner side widthwise grooves 13a and 13b extending in the tire widthwise direction, respectively.

The outer side widthwise grooves 13c that divide the outer side land portions 12C have the same shape as that of the widthwise grooves 13c depicted in FIG. 5 in the preceding embodiment.

The outer side widthwise grooves 13c have two pairs of paired bent portions Kp and Kq formed at positions same as each other (refer to broken lines in FIG. 4) in the tire widthwise direction, on the groove side faces 13cp and 13cq opposed to each other, such that the groove side face 13bp and the groove side face 13bq extend in parallel to each other and in a zigzag shape.

FIG. 7 is a partial enlarged plan view depicting one inner side widthwise groove 13b that divides an inner side land portion 12B and associated portions on an enlarged scale.

The inner side widthwise groove 13b has four pairs of paired bent portions Kp and Kq formed in the tire widthwise direction on the groove side faces 13bp and 13bq thereof, that are opposed to each other, such that each paired bent portions Kp and Kq are formed at the same positions (refer to broken lines in FIG. 7) in the tire widthwise direction.

The bent portions Kp adjoining each other in the tire widthwise direction on the groove side face 13bp are bent in bending directions opposite to each other such that the groove side face 13bp has a zigzag shape.

Similarly, the bent portions Kq adjoining each other in the tire widthwise direction on the groove side face 13bq are bent in bending directions opposite to each other such that the groove side face 13bp has a zigzag shape. The groove side face 13bp and the groove side face 13bq extend in parallel to each other.

In the inner side widthwise groove 13b, the groove side face 13bp and the groove side face 13bq that are opposed to each other extend in parallel to each other and in a zigzag shape in the tire widthwise direction while repetitively deflecting in the tire circumferential direction.

While the foregoing description explains the shape of the inner side widthwise groove 13b that divides the inner side land portion 12B, the inner side widthwise groove 13a that divides the inner side land portion 12A has the same shape, although not shown.

As described above, in the present embodiment, on the outer side widthwise groove 13c that divides the outer side land portion 12C, two pairs of the paired bent portions Kp and Kq are formed in the tire widthwise direction such that they are at the same positions with respect to the tire widthwise direction, on the groove side faces 13cp and 13cq that are opposed to each other. On the other hand, in the inner side widthwise grooves 13a and 13b that divide the inner side land portions 12A and 12B, four pairs of the paired bent portions Kp and Kq are formed in the tire widthwise direction such that they are at the same positions with respect to the tire widthwise direction, on the groove side faces 13ap, 13aq; 13bp, 13bq that are opposed to each other.

In the region of the inner side land portion 12A partitioned on the opposite sides thereof by the inner side circumferential grooves 11a and 11b and also in the region of the inner side land portion 12B partitioned on the opposite sides thereof by the inner side circumferential grooves 11b and 11c, the ground contact pressures tend to be increased to high values, and, upon grounding, the blocks on the opposite sides of the inner side circumferential grooves 11a and 11b come into contact with each other to suppress deformation of the blocks. For this reason, it is required that the amount of snow to be caught by the inner side widthwise grooves be increased in order to improve the snow column shearing force. On the other hand, in the region of the outer side land portion 12C partitioned by the outermost side circumferential groove 11d and the inner side circumferential groove 11c, the deformation of the blocks upon grounding is greater, and hence, it is required that the amount of snow to be caught and discharged by the outer side widthwise grooves be increased in order to maintain the traction effect.

By providing four pairs of bent portions Kp and Kq on the groove side faces of the inner side widthwise grooves 13a and 13b while providing two pairs of bent portions Kp and Kq on the groove side faces 13cp and 13cq of the outer side widthwise groove 13c, in such a way to make greater the number of bent portions Kp and Kq to be formed on the inner side widthwise grooves 13a and 13b, the amount of snow to be caught by the inner side widthwise grooves 13a and 13b can be increased. Meanwhile, by making smaller the number of bent portions Kp and Kq formed on the outer side widthwise groove 13c, it is possible to smoothen the discharge of snow thereby to increase the amount of snow to be discharged by the outer side widthwise groove 13c.

While the pneumatic tires according to the two embodiments of the present invention have been described, the mode of the present invention is not limited to the embodiments described above and includes what is carried out in various modes without departing from the subject matter of the present invention.

For example, the number of bent portions Kp and Kq to be formed on the inner side widthwise grooves 13a and 13b and the outer side widthwise groove 13c is not limited to the numbers used in the embodiments.

The pneumatic tire of the present invention can be applied not only to tires for trucks or buses but also to tires for passenger cars.

REFERENCE SIGNS LIST

1: Pneumatic tire
2: Bead ring
3: Carcass ply
4: Inner liner portion
5: Belt layer
6: Belt
7: Tread
8: Side wall portion
9: Bead portion
11a, 11b, 11c: Inner side circumferential groove
11d: Outermost side circumferential groove
12A, 12B: Inner side land portion
12C: Outer side land portion
12D: Shoulder land portion
13a, 13b: Inner side widthwise groove
13c: Outer side widthwise groove
13ap, 13aq; 13bp, 13bq; 13cp, 13cq: Groove side face
14A, 14B, 14C, 14D: Block
15: Widthwise sipe
Kp, Kq: Bent portion

The invention claimed is:

1. A pneumatic tire, wherein
the tire has a tread (7) partitioned into a plurality of land portions (12A, 12B, 12C, 12D) that are continuous in a tire circumferential direction, by a plurality of circumferential grooves (11a, 11b, 11c, 11d) extending in the tire circumferential direction,
the land portions (12A, 12B, 12C, 12D) continuous in the tire circumferential direction are divided into a plurality of blocks (14A, 14B, 14C, 14D) by a plurality of widthwise grooves (13a, 13b, 13c, 13d) extending in a tire widthwise direction, and
the blocks (14A, 14B, 14C, 14D) are segmented into a plurality of segmented blocks (14Ap, 14Bp, 14Cp, 14Dp) by a plurality of widthwise sipes (15) extending in the tire widthwise direction, characterized in that:

the circumferential grooves (11*a*, 11*b*, 11*c*, 11*d*) include one inner side circumferential groove (11*a*) formed on a tire equator line (Lc) in a middle in the tire widthwise direction, a plurality of inner circumferential grooves (11*b*, 11*c*) formed in pairs symmetrically with respect to said tire equator line (Lc), and a pair of outermost side circumferential grooves (11*d*) formed on an outer side of the paired inner circumferential grooves (11*b*, 11*c*), the inner side circumferential groove (11*a*) and the inner circumferential grooves (11*b*, 11*c*) have a groove width that is smaller than a groove width of the outermost side circumferential grooves (11*d*) and that allows the land portions on opposite sides of the inner side circumferential grooves to come into contact with each other upon grounding, a pair of groove side faces (13*ap*, 13*aq*; 13*bp*, 13*bq*; 13*cp*, 13*cq*) opposed to each other in the widthwise grooves (13*a*, 13*b*, 13*c*) provided between the pair of outermost side circumferential grooves (11*d*, 11*d*) are bent at bent portions (Kp, Kq), the land portions (12A, 12B, 12C) provided between the pair of outermost side circumferential grooves (11*d*, 11*d*) include an outer side land portion (12C) partitioned by the outermost side circumferential groove (11*d*) and the inner side circumferential groove (11*c*), and inner side land portions (12A, 12B) partitioned on the both sides thereof by the inner side circumferential grooves (11*a*, 11*b*; 11*b*, 11*c*), and the bent portions (Kp, Kq) formed on the groove side faces (13*ap*, 13*aq*; 13*bp*, 13*bq*) of the inner side widthwise grooves (13*a*, 13*b*) that divide the inner side land portions (12A, 12B) are greater in number than the bent portions (Kp, Kq) formed on the groove side faces (13*cp*, 13*cq*) of the outer side widthwise grooves (13*c*) that divide the outer side land portion (12C).

2. The pneumatic tire according to claim 1, wherein the bent portions (Kp, Kq) on the pair of opposed groove side faces (13*ap*, 13*aq*; 13*bp*, 13*bq*; 13*cp*, 13*cq*) form a pair or pairs, and the bent portions of the same pair are provided at same positions as each other with respect the tire widthwise direction.

3. The pneumatic tire according to claim 2, wherein the pairs of the bent portions (Kp, Kq) provided at the same positions as each other in the tire widthwise direction are provided in plural number in the tire widthwise direction, and the bent portions (Kp, Kp; Kq, Kq) adjacent to each other in the tire widthwise direction are bent in bending directions opposite to each other.

4. The pneumatic tire according to claim 1, wherein the widthwise sipes (15) extend in a zigzag shape in the tire widthwise direction while repetitively deflecting in the tire circumferential direction.

* * * * *